(12) United States Patent
Wang et al.

(10) Patent No.: US 10,687,271 B2
(45) Date of Patent: *Jun. 16, 2020

(54) NETWORK ACCESSING METHOD

(71) Applicant: Samsung Electronics Co., Ltd., Suwon-si, Gyeonggi-do (KR)

(72) Inventors: Hai Wang, Beijing (CN); Lei Zhou, Beijing (CN); Xufeng Zheng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,727

(22) Filed: Dec. 14, 2017

(65) Prior Publication Data

US 2018/0109996 A1   Apr. 19, 2018

Related U.S. Application Data

(63) Continuation of application No. 13/464,838, filed on May 4, 2012, now Pat. No. 9,867,121.

(30) Foreign Application Priority Data

May 5, 2011   (CN) .......................... 2011 1 0124554

(51) Int. Cl.
| | |
|---|---|
| H04H 20/71 | (2008.01) |
| H04W 48/14 | (2009.01) |
| H04W 4/70 | (2018.01) |
| H04W 4/08 | (2009.01) |
| H04W 8/18 | (2009.01) |

(52) U.S. Cl.
CPC ............. *H04W 48/14* (2013.01); *H04W 4/08* (2013.01); *H04W 4/70* (2018.02); *H04W 8/186* (2013.01)

(58) Field of Classification Search
None
See application file for complete search history.

(56) References Cited

U.S. PATENT DOCUMENTS

| | | | |
|---|---|---|---|
| 6,396,814 B1 | 5/2002 | Iwamura et al. | |
| 6,628,620 B1 | 9/2003 | Cain | |
| 7,171,476 B2 | 1/2007 | Maeda et al. | |
| 7,428,229 B2 | 9/2008 | Bonta et al. | |
| 7,904,535 B2 | 3/2011 | Luo et al. | |

(Continued)

OTHER PUBLICATIONS

Zhou et al.; "Proposed Text for network access entry for a large number of M2M devices"; IEEE C802.16p-11/0059r2; May 19, 2011; 4 pages.

(Continued)

*Primary Examiner* — Sithu Ko

(57) ABSTRACT

A network accessing method includes selecting a group representative dynamically from each machine to machine (M2M) terminal group, wherein terminals in the M2M terminal group not selected as the group representative serve as group members. The method also includes requesting, by the group representative, network access from a base station, and serving, as a group member automatically after entering an idle state or entering another cell. This enables multiple M2M terminals to access a network at the same time while avoiding network access congestion.

20 Claims, 3 Drawing Sheets

| FIELD | SIZE(BIT) | VALUE/DESCRIPTION | CONDITION |
|---|---|---|---|
| ... | ... | ... | ... |
| PROBABILITY THRESHOLD OF M2M GROUP REPRESENTATIVE SELECTION | 10 | PROBABILITY THRESHOLD VALUE OF QUANTIZED IN 0.001 STEPS AS FROM 0 TO 1 | |
| PROBABILITY STEP OF M2M GROUP REPRESENTATIVE SELECTION | 7 | PROBABILITY THRESHOLD VALUE OF QUANTIZED IN 0.001 STEPS AS FROM 0 TO 0 | |

(56) References Cited

U.S. PATENT DOCUMENTS

| | | | | |
|---|---|---|---|---|
| 2002/0018448 | A1* | 2/2002 | Amis | H04L 29/12254 370/255 |
| 2002/0055978 | A1 | 5/2002 | Joon-Bo et al. | |
| 2003/0083013 | A1 | 5/2003 | Mowery et al. | |
| 2003/0224793 | A1 | 12/2003 | Bonta et al. | |
| 2003/0231382 | A1* | 12/2003 | Ahn | H01S 5/125 359/344 |
| 2003/0233538 | A1* | 12/2003 | Dutertre | H04L 63/0272 713/151 |
| 2003/0236082 | A1 | 12/2003 | Aoki et al. | |
| 2004/0003111 | A1 | 1/2004 | Maeda et al. | |
| 2004/0091889 | A1 | 5/2004 | Perucho et al. | |
| 2005/0094574 | A1* | 5/2005 | Han | H04L 29/06 370/254 |
| 2005/0135249 | A1 | 6/2005 | Cromer et al. | |
| 2005/0213531 | A1 | 9/2005 | Nanda | |
| 2007/0091889 | A1* | 4/2007 | Xiao | H04W 84/20 370/390 |
| 2007/0201382 | A1* | 8/2007 | Ekl | H04W 84/20 370/254 |
| 2007/0214046 | A1* | 9/2007 | Falchuk | G06Q 10/06 705/14.42 |
| 2009/0034636 | A1 | 2/2009 | Kotecha et al. | |
| 2010/0046426 | A1 | 2/2010 | Shenoy et al. | |
| 2010/0302992 | A1* | 12/2010 | Zhuang | H04W 40/04 370/313 |
| 2011/0103302 | A1* | 5/2011 | Hall | A63F 13/10 370/328 |
| 2012/0142268 | A1* | 6/2012 | Tao | H04W 4/08 455/3.05 |
| 2012/0281681 | A1* | 11/2012 | Hsu | H04W 4/70 370/336 |

OTHER PUBLICATIONS

Notification of the Reasons for Rejection for Korean Patent Application No. 10-2012-0047366 dated Mar. 28, 2018; 10 pages.
International Search Report dated Nov. 26, 2012 in connection with International Application No. PCT/KR2012/003515.
Written Opinion of International Searching Authority dated Nov. 26, 2012 in connection with International Application No. PCT/KR2012/003515.
Extended European Search Report dated Mar. 31, 2015 in connection with European Patent Application No. 12779530.0; 12 pages.
Cha, Jaesun, et al., "Device ID and Group ID for 16p M2M Devices", IEEE 802.16 Broadband Wireless Access Working Group, IEEE C802.16p-11/0019, Mar. 6, 2011, 18 pages.
Cho, Hangyu, "Machine to Machine (M2M) Communications Technical Report"; IEEE.802.16p-10/0005; Nov. 11, 2010; 23 pages.
Heinzelman, et al., "An Application-Specific Protocol Architecture for Wireless Microsensor Networks"; IEEE Transactions on Wireless Communications, vol. 1. No. 4,; Oct.2002; pp. 660-670.
Hong, et al., "An Access-Based Energy Efficient Clustering Protocol for Ad Hoc Wireless Sensor Network"; XP010753577; IEEE; Sep. 5, 2004; pp. 1022-1026.
Li, Honggang, et al., "Group-based M2M Solutions", IEEE 802.16 Broadband Wireless Access Working Group, IEEE C802.16p-11/0013, Mar. 3, 2011, 12 pages.
Park, Giwon, et al., "Proposed Text for Network Reentry Procedure of Fixed M2M Device", IEEE 802.16 Broadband Wireless Access Working Group, IEEE C802.16p-11/0018, Mar. 6, 2011, 7 pages.
Zhang, et al., "An Novel Dynamic Clustering Algorithm based on Geographical Location for Wireless Sensor Networks"; XP031383117; 2008 International Symposium on Information Science and Engineering; Dec. 20, 2008; pp. 565-568.
Zhou, Lei, et al., "Proposed Text for Network Access Entry for a Large Number of M2M Devices", IEEEE 802.16 Broadband Wireless Access Working Group, IEEE C802.16p-11/0008r1, Mar. 6, 2011, 2 pages.
Zhou, Lei, et al., "Proposed Text for network access entry for a large Number of M2M devices"; IEEE C802.16p-11/0008; Mar. 6, 2011; 6 pages.
Zhou, Lei, et al., "Proposed Text for Network Access Entry for a Large Number of M2M Devices", IEEE 802.16 Broadband Wireless Access Working Group, IEEE C802.16p-11/0247r2, Sep. 20, 2011, 11 pages.
European Search Report in connection with European Application No. 19210483A dated Feb. 5, 2020, 13 pages.
Etri, "Distribution of Initial Ranging Access for Network Reentry," IEEE C802.16p-11/0020, Mar. 6, 2011, 15 pages.
Lan/Man Standards Committee of the IEEE Computer Society, "Air Interface for Broadband Wireless Access Systems, Enhancements to Support Machine-to-Machine Applications," IEEE P802.16p/D4, Apr. 5, 2012, 57 pages.
Heinzelman, Wend!, B., et al., "An Application-Specific Protocol Architecture for Wireless Microsensor Networks," IEEE Transactions on Wireless Communications, vol. 1, No. 4, Oct. 2002, 11 pages.
Li, Lan-Ying, et al., "Energy Balancing Clustering Algorithm for Wireless Sensor Network," 2009 International Conference on Networks Security, Wireless Communications and Trusted Computing, IEEE, 2009, 4 pages.

* cited by examiner

| FIELD | SIZE(BIT) | VALUE/DESCRIPTION | CONDITION |
|---|---|---|---|
| ... | ... | ... | ... |
| PROBABILITY THRESHOLD OF M2M GROUP REPRESENTATIVE SELECTION | 10 | PROBABILITY THRESHOLD VALUE OF QUANTIZED IN 0.001 STEPS AS FROM 0 TO 1 | |

FIG.3

| FIELD | SIZE(BIT) | VALUE/DESCRIPTION | CONDITION |
|---|---|---|---|
| ... | ... | ... | ... |
| PROBABILITY THRESHOLD OF M2M GROUP REPRESENTATIVE SELECTION | 10 | PROBABILITY THRESHOLD VALUE OF QUANTIZED IN 0.001 STEPS AS FROM 0 TO 1 | |
| PROBABILITY STEP OF M2M GROUP REPRESENTATIVE SELECTION | 7 | PROBABILITY THRESHOLD VALUE OF QUANTIZED IN 0.001 STEPS AS FROM 0 TO 0 | |

FIG.4

NETWORK ACCESSING METHOD

CROSS-REFERENCE TO RELATED APPLICATION(S) AND CLAIM OF PRIORITY

This application is a continuation of U.S. application Ser. No. 13/464,838, filed May 4, 2012, which claims the benefit Chinese Patent Application No. CN201110124554.9, filed May 5, 2011, the entire disclosures of which are hereby fully incorporated by reference.

TECHNICAL FIELD OF THE INVENTION

The present disclosure relates to mobile communications, and particularly to a network accessing method.

BACKGROUND OF THE INVENTION

Machine to machine (M2M) establishes wireless connections and enables data transmission between devices of networks, remote equipments and individual users in a real time manner. M2M can include a combination of techniques, including data collection, GPS, remote monitoring, telecommunications, and information technologies. M2M is, in some respects, an ecosystem including computers, networks, devices, sensors, and human beings. M2M enables service process automation, integrates information technology systems with real time states of non-IT devices of a company, and creates value-added services.

In practice, current M2M is used in public network services, i.e., for communications between human and machine or human and human. Since there are mass amounts of M2M service, the number of M2M terminals is also tremendous, e.g., a cell may serve tens of thousands (or even hundreds of thousands) of M2M terminals. When a huge number of M2M terminals access the network at the same time, network access congestion may occur, and a base station cannot provide network access for too many M2M terminals simultaneously.

SUMMARY OF THE INVENTION

To address the above-discussed deficiencies of the prior art, it is a primary object to provide a network accessing method to enable a large number of M2M terminals to access a network simultaneously and at the same time avoid network access congestion.

According to an aspect of the present disclosure, there is provided a network accessing method that includes selecting a group representative dynamically from each M2M terminal group, wherein terminals not selected serve as group members. The method also includes requesting, by the group representative, network access from a base station, and acting as a group member automatically after entering an idle state or entering another cell.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a schematic illustrating a structure of a threshold for group representative selection according to an embodiment of the present disclosure; and FIG. 4 is a schematic illustrating a structure of a threshold for group representative selection and a step value according to an embodiment of the present disclosure.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication system. Hereinafter, exemplary embodiments of the present disclosure will be described in detail with reference to the accompanying drawings. In the following description, only parts necessary for understanding of operations according to the present disclosure will be described and other parts will be omitted not to obscure the subject matter of the present disclosure.

In the present disclosure, for each M2M terminal group, at least one group representative is selected dynamically from the M2M terminal group, and members that are not selected serve as group members. The group representative requests network access from a base station on behalf of the M2M terminal group, i.e., the group representative represents the whole M2M terminal group to submit the network access request to the base station. This enables a large number of M2M terminals to access the network at the same time while avoiding network access congestion.

In the present disclosure, a group representative is selected in a dynamic manner, and changes into a member automatically after entering an idle state or entering another cell, thus problems such as delay and failure in network access resulting from factors such as movements of a group representative in an idle state can be solved.

A detailed description of embodiments is hereinafter given with reference to specific implementations and the accompanying drawings.

Figure 1:
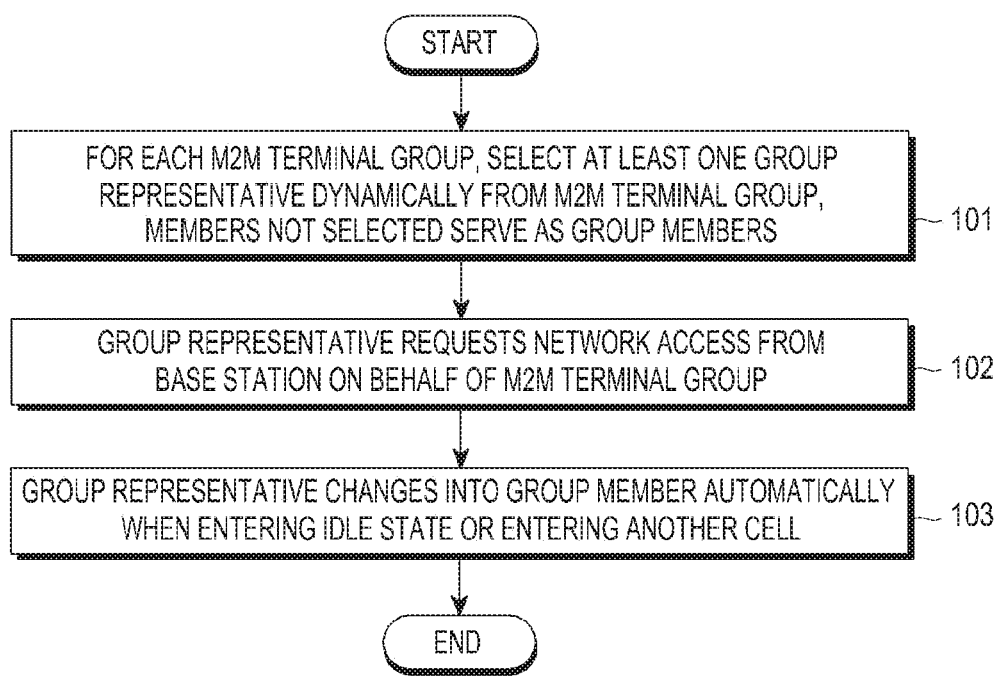
FIG. 1 is a flowchart illustrating a network access process according to an embodiment of the present disclosure.

FIG. 1 is a flowchart illustrating a network access process according to an embodiment of the present disclosure. In FIG. 1, M2M terminals in the network are divided into multiple M2M terminal groups, and each M2M terminal group has a unique identity in the network.

Referring to FIG. 1, the block 101 may be performed at the network side to divide all M2M terminals in the network into multiple M2M terminal groups according to a policy, such as putting M2M terminals having an attribute in common into one M2M terminal group. Having an attribute in common may refer to residing at geographical locations close to each other, having similar applications, and so on. The number of M2M terminals in each M2M terminal group may be the same or different, and is not restricted in the present disclosure.

Based on the M2M terminal groups divided according to the above-described manner, the network access process may include the following procedures.

In block 101, at least one group representative is selected dynamically from each M2M terminal group, and terminals not selected serve as group members.

Since each M2M terminal group has an identity unique in the network, when a group representative of a M2M terminal group is statically designated, movements of the group representative may result in delay in network access of the M2M terminal group because members of the M2M terminal group and the base station will not acquire knowledge of the state of the group representative when the group representative enters an idle state, moves into another cell, or has certain problems such as a sudden power-off. Thus, in block 101, the group representative is dynamically selected to reduce influences of movements of the group representative and such on the network access of the M2M terminal group. The dynamic selection will be described hereinafter.

In block 102, the group representative requests network access from a base station on behalf of the M2M terminal group.

When the group representative requests network access from the base station, members in the M2M terminal group may monitor for a response sent by the base station in response to the request, e.g., a Ranging Acknowledgement (RNG-ACK). A RNG-ACK indicating success means group members can access the network, a RNG-ACK indicating continue means the group representative needs to send another network access request, and a RNG-ACK indicating abort means the group members may wait for a delay time and attempt to access the network after the delay.

In block 103, the group representative acts as a group member automatically when entering an idle state or entering another cell.

That is, when the group representative enters an idle state or another cell, the group representative no longer serves as a group representative, but changes into a group member automatically.

The network access process shown in FIG. 1 is then completed.

In the above block 101, the dynamic selection of the group representative of the M2M terminal group is performed in the following situations: when the base station is paging the M2M terminal group, or when the M2M terminal group is to transmit data to the base station where the state is the opposite state of the idle state.

Figure 2:
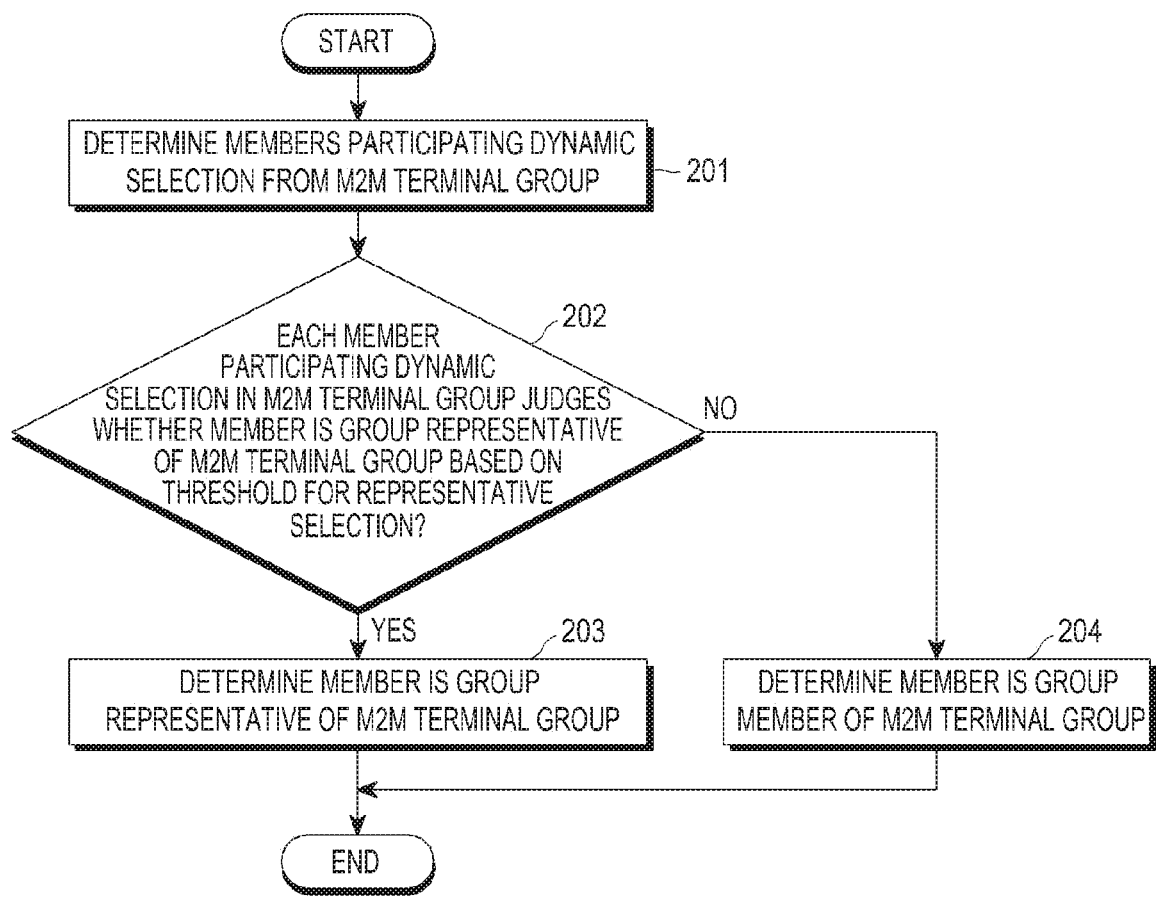
FIG. 2 is a flowchart illustrating a process of dynamic selection of a group representative according to an embodiment of the present disclosure.

The dynamic selection in practice may be performed according to the process shown in FIG. 2.

FIG. 2 is a flowchart illustrating a process of dynamic selection of a group representative according to an embodiment of the present disclosure.

In block 201, members participating in the automatic selection are determined in the M2M terminal group.

In block 202, each member participating in the automatic selection judges whether the member itself is a group representative of the M2M terminal group according to a threshold for representative selection transmitted by the base station. Thus, each terminal determines that the terminal itself is a group representative of the M2M terminal group in response to a judgment that the member itself is a group representative, or determines that the member itself is not a group representative of the M2M terminal group in response to a judgment that the member itself is a group representative.

The threshold for representative selection is broadcast to the M2M terminal group via an SCD signaling by the base station. Specifically, the structure of an information element as shown in FIG. 3 may be adopted.

Specifically, the judgment in block 202 may be performed based on a principle that a random member in the M2M terminal groups serves as the group representative (i.e., from a long-term perspective, the number of times each member in the M2M terminal group serves as the group representative should be approximately the same). The procedure may include the following steps.

In step 1, each member of the M2M terminal group calculates a random probability $P_{selection}$. The $P_{selection}$ may be obtained according to formula 1:

$$P_{selection} = ((X_{rand\_seed} * m + n) \bmod j)/j \qquad [\text{Eqn. 1}]$$

In formula 1, m and n are pre-set parameters, and one of m and n is a prime number, j is a maximum random value (in this embodiment, j may be set to be 65521), and $X_{rand\_seed}$ is a value randomly selected by the member from between a minimum random value and j. The minimum random value may be 0, for example.

In step 2, the member of the M2M terminal group compares the $P_{selection}$ calculated with a threshold for representative selection transmitted by the base station. At block 203, the member determines that the member is the group representative of the M2M terminal group if $P_{selection}$ is smaller than the threshold; otherwise, at block 204, the member determines that the member is a group member of the M2M terminal group.

It should be noted that one of two methods (denoted herein as method 1 and method 2) may be further executed when the group representative cannot be determined in two situations. In situation 1, the group representative cannot be determined according to the process as shown in FIG. 2. For example, the $P_{selection}$ of all members in the M2M terminal group is larger than or equal to the threshold in the comparison of the $P_{selection}$ calculated and the threshold for representative selection transmitted by the base station, i.e., all members are determined as group members according to the threshold for representative selection transmitted by the base station. In situation 2, the group representative cannot be determined when the request sent by the group representative is not successfully received by the base station.

Method 1 may include the following: The base station transmits a new threshold for representative selection to the M2M terminal group. The new threshold is different from the previous threshold. Then, each member participating in the dynamic selection performs the judgment in block 202 utilizing the new threshold for representative selection. If problems similar to situations 1 or 2 occur after the new threshold for representative selection is used, then method 1 is performed again.

Method 2 may include the following: The base station transmits a step value to the M2M terminal group, and may transmit the initial threshold for representative selection together with the step value. The structure of an information element as shown in FIG. 4 may be adopted. Then, each member participating in the dynamic selection of group representative in the M2M terminal group performs the judgment in block 202 again utilizing the initial threshold and the step value transmitted by the base station. Formula 2 may be adopted as follows:

$$\theta_{i+1} = \theta_0 + \varepsilon \cdot 2^n, \quad [\text{Eqn. 2}]$$

where $\theta_{i+1}$ is the threshold for representative selection to be used in block 202, $\theta_0$ is the initial threshold for representative selection, $\varepsilon$ is the step value, n is the number of calculations performed since the reception of the initial threshold until the $\theta_{i+1}$, is calculated.

Preferably, the formula 2 may be replaced by formula 3 to obtain a further extended embodiment:

$$\theta_{i+1} = \theta_i + \varepsilon \cdot 2^n, \quad [\text{Eqn. 3}]$$

where $\theta_i$ is the threshold for representative selection used in the previous calculation of $\theta_{i+1}$.

Hence, the group representative can be dynamically selected from the M2M terminal group in block 101 according to the process shown in FIG. 2. In practice, multiple group representatives may be selected.

Supposing that the group representative of the M2M terminal group has been selected according to the process shown in FIG. 2, and the group representative has successfully implemented network access of the M2M terminal group, when another network access of the M2M terminal group is performed, the group representative which previously implemented the network access of the M2M terminal group successfully may send another network access request. If the base station fails to receive the request, the dynamic selection of block 101 will be performed. Thus, there is no need to use extra resources for selecting the group representative. Specifically, before the dynamic selection of block 101 is performed, the process may further include: selecting a member which was selected as the group representative of the M2M terminal group, and directing the member to request network access from the base station as a group representative on behalf of the M2M terminal group, and performing the dynamic selection in block 101 if the request is not successfully received by the base station. In order to facilitate identifying a member which was previously selected as the group representative of the M2M terminal group, each group representative may keep a record before the group representative changes into a member indicating that the member was a group representative. Accordingly, the method of selecting a member which was selected as the group representative of the M2M terminal group may include: each member of the M2M terminal checks records in the member, and judges whether the member was selected as the group representative of the M2M terminal group previously. Thus, a member that was selected as the group representative can be identified in the M2M terminal group.

The method of determining the members participating in the dynamic representative selection may be as follows.

The members participating in the dynamic representative selection may be all members of the M2M terminal group, including members which were selected as group representatives, members which have never been group representatives, and members which newly entered the cell to which the M2M terminal group belongs.

Preferably, according to another embodiment, the members participating in the dynamic representative selection may be members of the M2M terminal group excluding the members which were selected as group representatives. Accordingly, in block 102, the group representative requesting network access may include a group representative dynamically selected and a member which had been selected as a group representative. That is, although a previous group representative may have become a group member for entering an idle state or entering another cell, the previous group representative may directly serve as a current group representative, thus saving resources for selection.

Alternatively, the members participating in the dynamic representative selection may be all members that received an activate message from the base station.

The activate message is sent by the base station when the base station determines to update the group representative of the M2M terminal group (the message may not be sent for adding a group representative). Generally, the frequency of the base station sending the threshold for representative selection according to method 1 or the frequency of the base station sending the step value according to method 2 may be remarkably higher than the frequency of the base station sending the activate messages. It can be seen that a member that has moved to the coverage of a second base station and has not received an activate message from the second base station will not become a group representative when it is required that the members having received the activate message from the base station participate in the dynamic selection of group representative. Therefore, impacts of new group members on the group representative selection process are reduced, the base station can have more control over the group representative, and signaling overhead is also reduced.

Alternatively, the members participating in the dynamic selection of group representation may be members that have received the activate message and have not been group representatives in the M2M terminal group.

Accordingly, the group representatives requesting network access from the base station in block 102 may include group representatives dynamically selected and members that have received an activate message sent by the base station and used to be group representatives.

The technical scheme of the present disclosure is as described above.

From the above technical scheme, it can be seen that according to the present disclosure, all M2M terminals are divided into multiple M2M terminal groups, and for each M2M terminal group, at least one group representative is dynamically selected from the M2M terminal group, and members not selected serve as group members. The group representative requests network access from a base station on behalf of the M2M terminal group. Having the group representative request network access on behalf of the whole M2M terminal group can enable a large number of M2M terminals access a network at the same time while avoiding network access congestion.

Further, according to the present disclosure, a group representative is selected in a dynamic manner, and changes into a member automatically after entering an idle state or entering another cell. Thus, problems such as delay and failure in network access resulted from factors such as movements of a group representative in an idle state can be solved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to access a network by a terminal, the method comprising:
   receiving a broadcast message comprising a threshold value from a base station;
   generating a random number;
   determining whether the terminal is a group delegate in a group based on a comparison of the threshold value and the random number, wherein the terminal is one among a plurality of terminals included in the group;
   transmitting, to the base station, a network access request requesting access to the network for the plurality of terminals included in the group on behalf of group members when the terminal is determined as the group delegate;
   receiving a response message transmitted from the base station in response to the network access request;
   performing network access based on the response message; and
   transitioning from being the group delegate to a group member in the group,
   wherein the random number is generated based on a function of a randomly selected number, and the function of the randomly selected number is configured based on a prime number.

2. The method of claim 1, wherein the threshold value is a random selection probability value.

3. The method of claim 1, wherein the response message comprises at least one of success information, abort information and continue information, and
   wherein the success information indicates that the group members are able to access the network, the abort information indicates that the group members will wait for a time and the continue information indicates that the group delegate needs to send another access request.

4. The method of claim 1, wherein the determining whether the terminal is the group delegate based on the comparison of the threshold value and the random number comprise:
   determining that the terminal is the group delegate if the threshold value is greater than the random number; and
   determining that the terminal is not the group delegate if the threshold value is less than the random number.

5. The method of claim 1, the transmitting the network access request is skipped when the terminal is not determined as the group delegate.

6. A method to access a network by a base station, the method comprising:
   broadcasting a message comprising a threshold value;
   receiving a network access request requesting access to the network for a plurality of terminals included in a group from a terminal, wherein the terminal is one among the plurality of terminals included in the group;
   broadcasting a response message in response to the network access request; and
   transitioning from being a group delegate to a group member in the group,
   wherein the terminal is a delegate on behalf of group members in the group determined based on a comparison of the threshold value and a random number generated by the terminal, and
   wherein the random number is generated based on a function of a randomly selected number, and the function of the randomly selected number is configured based on a prime number.

7. The method of claim 6, wherein the threshold value is a random selection probability value.

8. The method of claim 6, wherein the response message comprises at least one of success information, abort information and continue information, and
   wherein the success information indicates that the group members are able to access the network, the abort information indicates that the group members will wait for a time and the continue information indicates that the group delegate needs to send another access request.

9. The method of claim 6, wherein the terminal is determined as the group delegate if the threshold value is greater than the random number.

10. The method of claim 6, wherein the response message is broadcasted to the group members.

11. A terminal, comprising:
    a transceiver configured to transmit or receive data; and
    a processor configured to control to:
      receive a broadcast message comprising a threshold value from a base station,
      generate a random number,
      determine whether the terminal is a group delegate in a group based on a comparison of the threshold value and the random number, wherein the terminal is one among a plurality of terminals included in the group,
      transmit, to the base station, a network access request requesting access to a network for the plurality of terminals included in the group on behalf of group members when the terminal is determined as the group delegate,
      monitor a response message transmitted from the base station in response to the network access request, and
      perform network access based on the response message,
      transition from being the group delegate to a group member in the group, and wherein the random number is generated based on a function of a randomly selected number, and the function of the randomly selected number is configured based on a prime number.

12. The terminal of claim 11, wherein the threshold value is a random selection probability value.

13. The terminal of claim 11, wherein the response message comprises at least one of success information, abort information and continue information, and
    wherein the success information indicates that the group members are able to access the network, the abort information indicates that the group members will wait for a time and the continue information indicates that the group delegate needs to send another access request.

14. The terminal of claim 11, wherein the processor is configured to determine that the terminal is the group delegate if the threshold value is greater than the random number, and determine that the terminal is not the group delegate if the threshold value is less than the random number.

15. The terminal of claim 11, the processor is further configured to skip transmission of the network access request when the terminal is not determined as the group delegate.

16. A base station, comprising:
a transceiver configured to transmit or receive data; and
a processor configured to control to:
- broadcast a message comprising a threshold value,
- receive a network access request requesting access to a network for a plurality of terminals included in a group from a terminal, wherein the terminal is one among the plurality of terminals included in the group,
- broadcast a response message in response to the network access request, and
- transition from being a group delegate to a group member in the group, wherein the terminal is a delegate on behalf of group members in the group determined based on a comparison of the threshold value and a random number generated by the terminal, and wherein the random number is generated based on a function of a randomly selected number, and the function of the randomly selected number is configured based on a prime number.

17. The base station of claim 16, wherein the threshold value is a random selection probability value.

18. The base station of claim 16, wherein the response message comprises at least one of success information, abort information and continue information, and wherein the success information indicates that the group members are able to access the network, the abort information indicates that the group members will wait for a time and the continue information indicates that the group delegate needs to send another access request.

19. The base station of claim 16, wherein the terminal is determined as the group delegate if the threshold value is greater than the random number.

20. The base station of claim 16, wherein the response message is broadcasted to the group members.

* * * * *